(No Model.)

C. S. SHARP.
MOWING MACHINE.

No. 548,013. Patented Oct. 15, 1895.

Witnesses
Raymond F. Barnes.
Fabius S. Elmore.

Inventor
C. S. Sharp
By his Attorney
O. T. Dodge

UNITED STATES PATENT OFFICE.

CHARLES S. SHARP, OF AUBURN, NEW YORK, ASSIGNOR TO THE D. M. OSBORNE & COMPANY, OF SAME PLACE.

MOWING-MACHINE.

SPECIFICATION forming part of Letters Patent No. 548,013, dated October 15, 1895.

Application filed February 11, 1892. Serial No. 421,168. (No model.)

*To all whom it may concern:*

Be it known that I, CHARLES S. SHARP, of Auburn, county of Cayuga, and State of New York, have invented a new and useful Improvement in Mowing-Machines, of which the following is a specification.

The aim of my invention is to provide a mowing-machine with simple means to assist the operator in lifting the cutting mechanism, to the end that he may be relieved of the excessive effort ordinarily required, and this without in any manner affecting or changing the operation of the parts when the machine is in action. To this end I combine with the ordinary lifting-lever a spring and an intermediate connecting link or rod, so arranged that when the lever is forward and the cutting mechanism down in its operative position the link is thrown past the center, so that the spring exerts no lifting effect whatever, but on the contrary the spring is brought into action by the backward movement of the lever, so that it serves to lift the whole or substantially the whole weight of the cutting mechanism as it is lifted.

Figure 1:
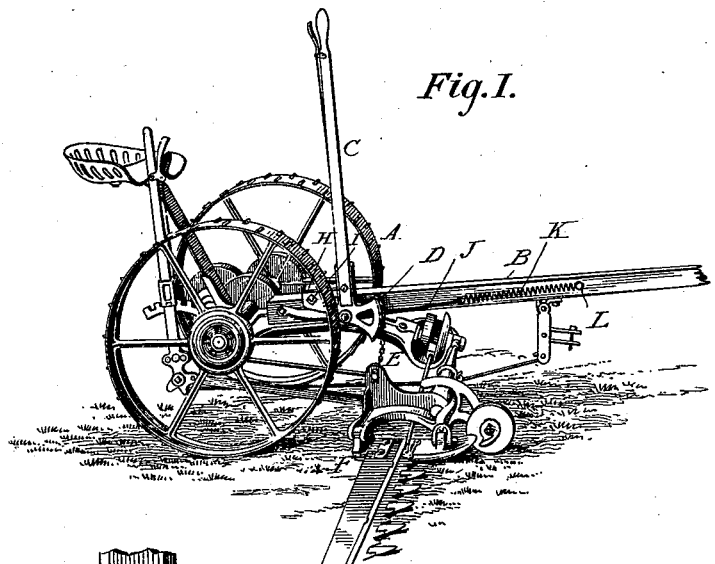
Figure 2:
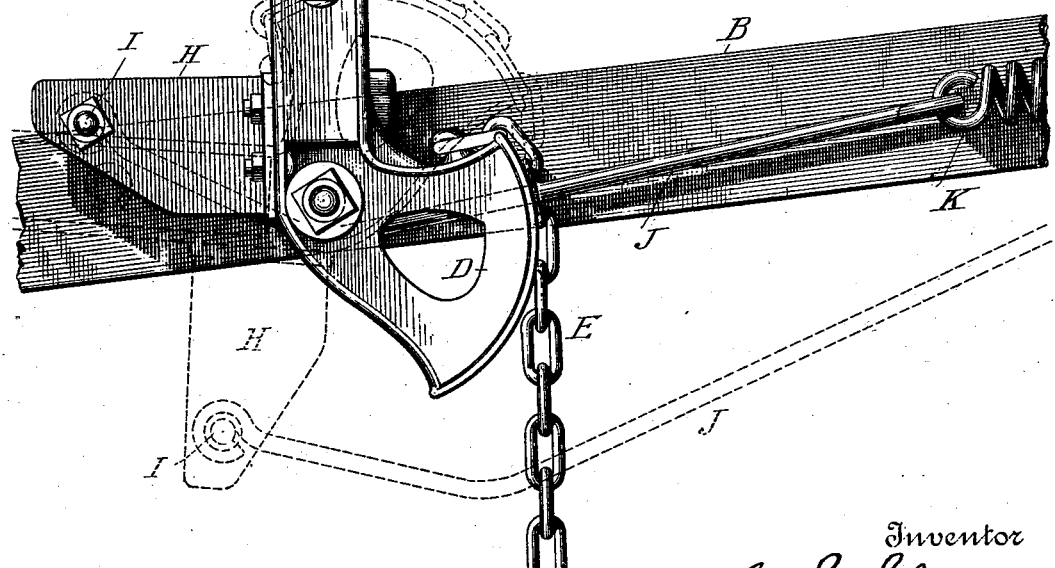

In the accompanying drawings, Figure 1 is a perspective view of the well-known Osborne mower provided with my improvement. Fig. 2 is a side elevation, on an enlarged scale, of the lifting-lever and the spring connection.

Referring to the drawings, A represents the wheeled frame of the mower provided with a rigid forwardly-extending draft-pole or tongue B and with a hand-lever C, adapted to swing forward and backward and carrying at its lower end the sector-plate D, from which the lifting-chain E is extended downward to a cutting mechanism F, which is connected with the main frame in such manner that it may be raised and lowered bodily by the action of the lever and chain. The foregoing parts are all of ordinary construction and form no part of my invention, and being familiar to every person skilled in the art it is unnecessary to illustrate or describe them in detail herein.

As the machines are ordinarily constructed the entire weight of the cutting mechanism is received upon the chain and lever and the operator is compelled to apply muscular power sufficient to raise the entire weight of the cutting mechanism.

In applying the present improvement I secure rigidly to or form upon the sector-plate or to the lower end of the lever attached thereto a rearwardly-extending arm H, and to the rear end of this arm I connect by a pivot-bolt I or otherwise a rod or link J, which is bent downward and extended forward below the fulcrum of the lever and along the side of the pole, its forward end being hooked or otherwise connected to a strong spiral spring K, which is in turn extended along the pole and fixed at its forward end thereto by a bolt or other fastening L. As the upper end of the lever is thrown forward and the cutting mechanism thereby lowered to its operative position, the arm H is turned upward and the rear end of the rod J carried with it until finally the rear end of the rod stands with its forward end above the fulcrum or axis of the lever, as plainly shown in Fig. 2, in which position of the parts the spring exerts a forward rather than a backward pull upon the lever, so that there is no tendency whatever of the spring to lift the cutting mechanism. This arrangement of the spring actions to "pass the center" and the consequent cessation of the lifting action is of the essence of my invention. When the lever is thrown backward to exert a lifting effect upon the cutting mechanism, the arm H is depressed and the rear end of the rod J carried below the fulcrum of the lever, whereupon the spring, which is under high tension, acts through the rod to turn the lever, and thus lift or assist in lifting the cutting devices. This changed relation of the parts and the consequent lifting action of the spring is clearly indicated in dotted lines in Fig. 2. The arrangement of the spring action to pass the center is advantageous, not only because the cutting mechanism is permitted to ride upon the surface of the ground and operated in the ordinary manner, but also because the connections hold the lever when thrown forward steadily in position, so that it is prevented from vibrating forward and backward in the ordinary objectionable manner. It will be observed that when the hand-

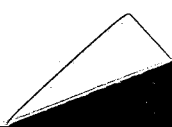

lever is thrown forward to its extreme limit the rod J rises beneath and against the fulcrum of the lever, so that the rod serves as a stop to prevent the lever from falling forward, while at the same time the rod acts to hold it forward. In this way the lever is held securely in position without the assistance of any special stop or locking device and is prevented from thrashing forward and backward, as it would otherwise do.

It will be obvious that the form and arrangement of the parts may be modified within the range of mechanical skill or to suit the fancy of the constructer, provided the mode of action herein described is retained, the essence of the invention lying in the combination, with the lifting-lever, of the spring and its rod or link arranged to pass the center and cease its lifting influence.

What I claim as my invention is—

In a mowing machine, the sector lever and its chain forward of the fulcrum, connected to the cutting mechanism, in combination with the arm H extending rearward rigidly from the lever, the angular rod J, jointed to the arm H, and extending thence forward beneath the fulcrum of the lever, the tension spring K connected at one end to said rod, and at the opposite end to the pole, the joint connection of said rod with the arm being moved by the lever above and below a straight line connecting the pivot of the lever and the forward point of attachment of the spring, when moving below such line the spring acting to assist in raising the cutting mechanism, and when above such line acting to hold the lever in its forward position with the cutting mechanism down, such forward position of the lever being limited by the rod J bearing against the fulcrum of the lever, substantially as described.

In testimony whereof I hereunto set my hand, this 19th day of December, 1891, in the presence of two attesting witnesses.

CHARLES S. SHARP.

Witnesses:
  C. F. BALDWIN,
  C. E. ALMY.